(12) United States Patent
Sato

(10) Patent No.: US 11,420,321 B2
(45) Date of Patent: Aug. 23, 2022

(54) SPECIFYING DATA GENERATING APPARATUS, SPECIFYING DATA GENERATING METHOD, AND COMPUTER-READABLE MEDIUM HAVING RECORDED THEREON SPECIFYING DATA GENERATING PROGRAM

(71) Applicant: Arithmer Inc., Tokyo (JP)

(72) Inventor: Daisuke Sato, Tokyo (JP)

(73) Assignee: Arithmer Inc., Tokyo (JP)

( * ) Notice: Subject to any disclaimer, the term of this patent is extended or adjusted under 35 U.S.C. 154(b) by 0 days.

(21) Appl. No.: 17/451,822

(22) Filed: Oct. 22, 2021

(65) Prior Publication Data

US 2022/0040847 A1    Feb. 10, 2022

Related U.S. Application Data

(63) Continuation of application No. PCT/JP2020/017356, filed on Apr. 22, 2020.

(30) Foreign Application Priority Data

Apr. 23, 2019 (JP) .............................. JP2019-081957

(51) Int. Cl.
*G05B 15/00* (2006.01)
*G05B 19/00* (2006.01)
(Continued)

(52) U.S. Cl.
CPC .......... *B25J 9/0081* (2013.01); *G05B 19/423* (2013.01)

(58) Field of Classification Search
CPC ............................. B25J 9/0081; G05B 19/423
See application file for complete search history.

(56) References Cited

U.S. PATENT DOCUMENTS 5,993,044 A    11/1999   Ohto
9,052,710 B1 *  6/2015   Farwell ................ G05B 19/423
(Continued)

FOREIGN PATENT DOCUMENTS

EP    2366502 A1    9/2011
JP    H08339222 A   12/1996
(Continued)

OTHER PUBLICATIONS

Office Action issued for counterpart Japanese Application No. 2019-081957, issued by the Japanese Patent Office dated Mar. 17, 2020 (drafted on Mar. 13, 2020).

(Continued)

*Primary Examiner* — Harry Y Oh

(57) ABSTRACT

A specifying data generating apparatus configured to generate specifying data for causing a robot to reproduce a motion of a target object including a generating unit configured to generate, based on manual data indicative of a motion of a target object manually operated, specifying data for specifying, in association with a time, a position and a posture of an end effector of a robot configured to imitate the motion of the target object, and a correcting unit configured, when a period during which a motion of the end effector operated according to the specifying data generated by the generating unit deviates from a predetermined tolerance has occurred, to correct, through extension in a time direction, the specifying data of at least the period during which there is the deviation from the tolerance.

20 Claims, 22 Drawing Sheets

(51) Int. Cl.
  *B25J 9/00*     (2006.01)
  *G05B 19/423*   (2006.01)

(56) References Cited

U.S. PATENT DOCUMENTS

| | | |
|---|---|---|
| 2003/0014156 A1 | 1/2003 | Hashimoto |
| 2003/0108415 A1 | 6/2003 | Hosek |
| 2011/0015787 A1* | 1/2011 | Tsusaka ............... G05B 19/423 901/4 |
| 2016/0052132 A1* | 2/2016 | Kim ....................... B25J 9/1689 901/3 |
| 2017/0266816 A1 | 9/2017 | Takeuchi |

FOREIGN PATENT DOCUMENTS

| | | |
|---|---|---|
| JP | H1069310 A | 3/1998 |
| JP | 2003001576 A | 1/2003 |
| JP | 2005509277 A | 4/2005 |
| JP | 2011174871 A | 9/2011 |
| JP | 2011203936 A | 10/2011 |
| JP | 2014161918 A | 9/2014 |
| JP | 2017164877 A | 9/2017 |
| WO | 2017085811 A1 | 5/2017 |

OTHER PUBLICATIONS

Decision to Grant a Patent issued for counterpart Japanese Application No. 2019-081957, issued by the Japanese Patent Office dated May 26, 2020 (drafted on May 18, 2020).
International Search Report and (ISA/237) Written Opinion of the International Search Authority for International Patent Application No. PCT/JP2020/017356, mailed by the Japan Patent Office dated Jul. 28, 2020.

* cited by examiner

SPECIFYING DATA GENERATING APPARATUS, SPECIFYING DATA GENERATING METHOD, AND COMPUTER-READABLE MEDIUM HAVING RECORDED THEREON SPECIFYING DATA GENERATING PROGRAM

The contents of the following Japanese patent application are incorporated herein by reference:
NO. 2019-081957 filed in JP on Apr. 23, 2019, and PCT/JP2020/017356 filed in WO on Apr. 22, 2020.

BACKGROUND

1. Technical Field

The present invention relates to a specifying data generating apparatus, a specifying data generating method, and a computer-readable medium having recorded thereon a specifying data generating program.

2. Related Art

There is a generating apparatus configured to generate instruction data to instruct motions of a robot so that an end effector of the robot tracks a position of an input teaching point (for example, refer to Patent Document 1).

Patent Document 1: Japanese Patent Application Publication No. H8-339222

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
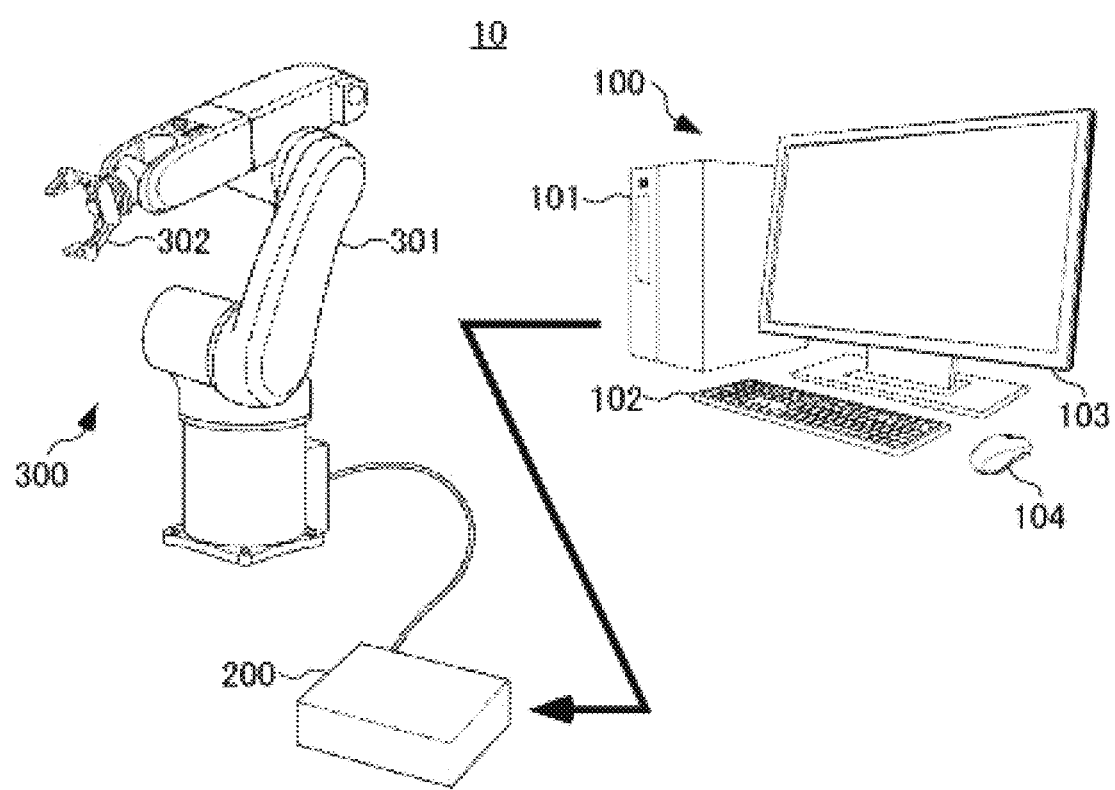
FIG. 1 is a schematic view showing an industrial robot system.

FIG. 1 is a schematic view showing an industrial robot system. A robot system 10 comprises an information processing apparatus 100, a controller 200 and a robot 300.

The robot 300 has an arm portion 301 and an end effector 302. The end effector 302 is arranged at a tip end of the arm portion 301, and is configured to hold or open a target object that is a target of an operation by the robot 300.

The arm portion 301 of the robot 300 has a plurality of articulations that can be individually bent or stretched. In addition, the arm portion 301 can rotate the end effector 302 at a coupling portion with the end effector 302. By a combination operation of bending and stretching of the arm portion 301 and rotation of the end effector 302, the robot 300 can displace the end effector 302 to a position and a posture that are specified by the controller 200.

Therefore, it is possible to give motions to the target object by operating the robot 300 with the target object being held by the end effector 302. As used herein, the motions of the target object include applying vibration, rotation or the like during movement, in addition to simple movement of the target object, and a fluid or powders included in the target object, a mixture thereof and the like can be stirred, mixed and separated by the motions.

The controller 200 is configured to drive the robot 300 according to the specifying data acquired from the information processing apparatus 100. Here, the specifying data acquired by the controller 200 includes information for specifying, in association with an elapsed time, a position and a posture of the end effector 302 of the robot 300. Therefore, in the robot system 10, causing the controller 200 to acquire the specifying data from the information processing apparatus 100 can cause the end effector 302 to perform an operation of specified six degrees of freedom (x, y, z, $R_x$, $R_y$, $R_z$), thereby operating the target object.

The information processing apparatus 100 is a general-purpose personal computer including a body 101, a keyboard 102, a display 103 and a pointing device 104. The information processing apparatus 100 is configured to load, into the body 101, a program for causing a process for generating specifying data to be carried out, thereby operating as a specifying data generating apparatus 110 configured to generate specifying data, as described later.

The specifying data generated by the specifying data generating apparatus 110 formed in the information processing apparatus 100 is transferred to the controller 200 via a communication line such as LAN, Internet and Bluetooth (registered trademark). The specifying data generated by the specifying data generating apparatus 110 may also be acquired by the controller 200 via a recording medium such as a non-volatile memory card, a magnetic recording medium and a laser card.

Figure 2:
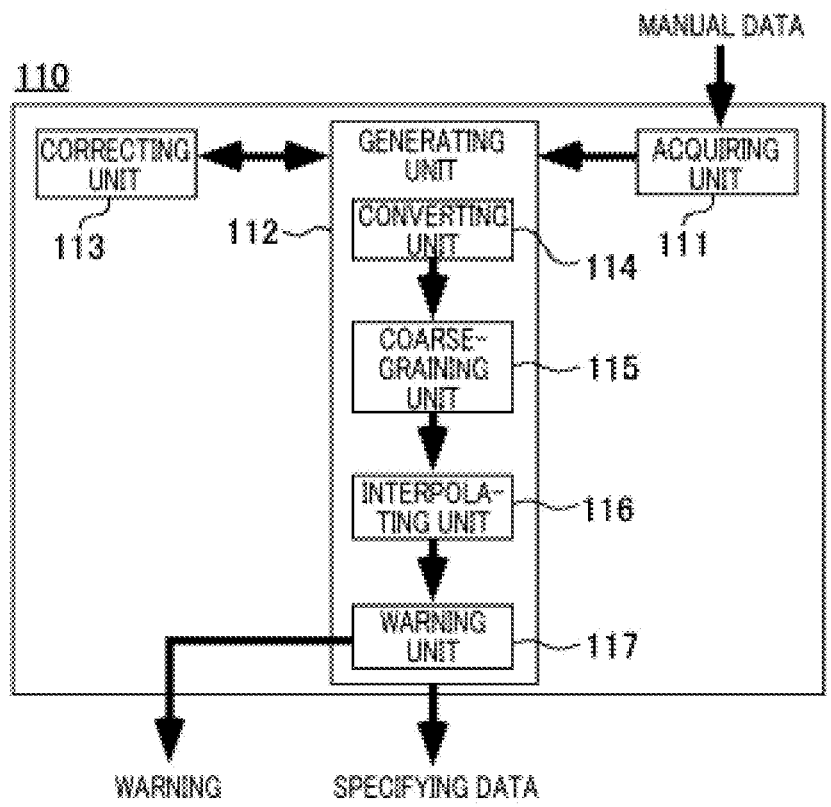
FIG. 2 is a block diagram of a specifying data generating apparatus 110.

FIG. 2 is a block diagram of the specifying data generating apparatus 110 formed in the information processing apparatus 100. The specifying data generating apparatus 110 comprises an acquiring unit 111, a generating unit 112 and a correcting unit 113.

The acquiring unit 111 includes a communication device, an interface, a medium driving device and the like capable of receiving data from an outside of the information processing apparatus 100. Thereby, manual data that is a source of the specifying data is acquired from the outside of the specifying data generating apparatus 110 and is supplied to the generating unit 112.

The generating unit 112 has a converting unit 114, a coarse-graining unit 115, an interpolating unit 116 and a warning unit 117. The generating unit 112 is configured to receive the manual data supplied from the acquiring unit 111 and to generate specifying data that is provided to the controller 200.

The correcting unit 113 is configured to correct the specifying data generated by the generating unit 112 with respect to at least a period during which a value of data exceeds a threshold, which will be described later. Therefore, when the correcting unit 113 has corrected the specifying data, the generating unit 112 is configured to output the specifying data including the period corrected by the correcting unit 113.

Figure 3:
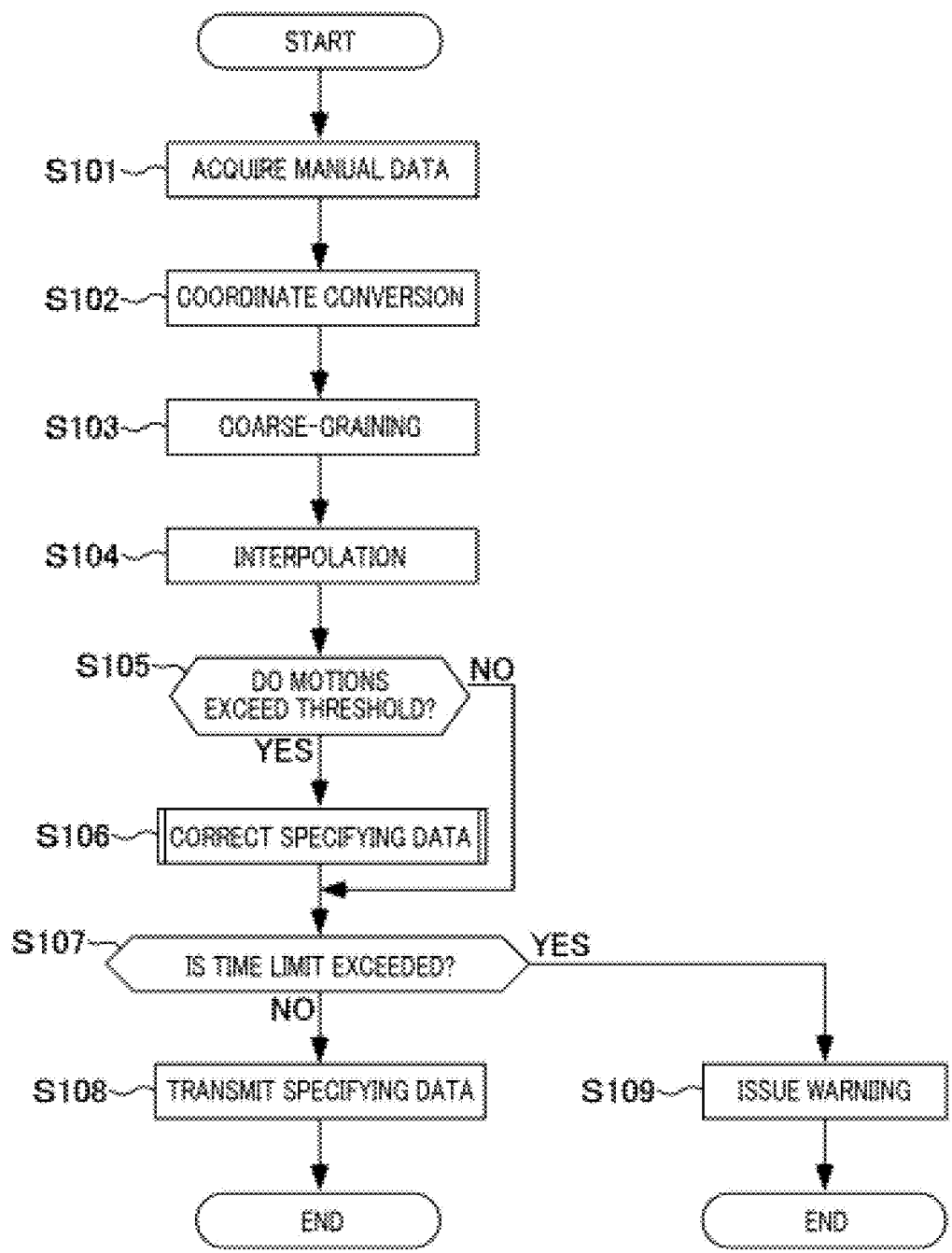
FIG. 3 is a flow diagram showing an operation procedure of the specifying data generating apparatus 110.

FIG. 3 is a flow diagram showing an operation procedure of the generating unit 112 of the specifying data generating apparatus 110. The specifying data generating apparatus 110 first acquires manual data through the acquiring unit 111 (step S101). The manual data acquired by the generating unit 112 is data in which motions of a target object, which are made when the target object, for example, which is a target of an operation by the robot 300, is operated by a human, are chronologically recorded every 8 ms, for example.

More specifically, for example, when it is intended to cause the robot 300 to imitate a human operation of mixing or separating, by shaking, a container in which a mixture of the above-described kinds of powders or liquid is contained, motions generated in the container by the human operation may be recorded and the recorded data may be used as the manual data. The manual data is, for example, data in which an acceleration signal acquired from an acceleration sensor mounted to the container is recorded in association with an elapsed time. In addition, data in which motions of a marker attached to a human who operates the container are recorded with a motion capture of performing imaging by a plurality of cameras arranged stereographically may be used as the manual data.

By acquiring the manual data generated in this way, the generating unit 112 generates specifying data for causing the robot 300 to imitate a motion generated in the target object by the human operation. In this case, the generating unit 112 first converts, by the converting unit 114, a coordinate system of the manual data whose origin is $(x_0, y_0, z_0, R_{x0}, R_{y0}, R_{z0})$ into a coordinate system of the specifying data whose origin is $(X_0, Y_0, Z_0, R_{X0}, R_{Y0}, R_{Z0})$ (step S102). Here, the coordinate system of the manual data is a coordinate system representing a position $(x, y, z)$ and a posture $(R_x, R_y, R_z)$ of the target object that are observed when recording the manual data, a position of the marker, or the like. On the other hand, the coordinate system of the specifying data is a coordinate representing a position $(X, Y, Z)$ and a posture $(R_X, R_Y, R_Z)$ of the end effector 302 that are indicated when the controller 200 instructs the robot 300 to operate.

Figure 4:
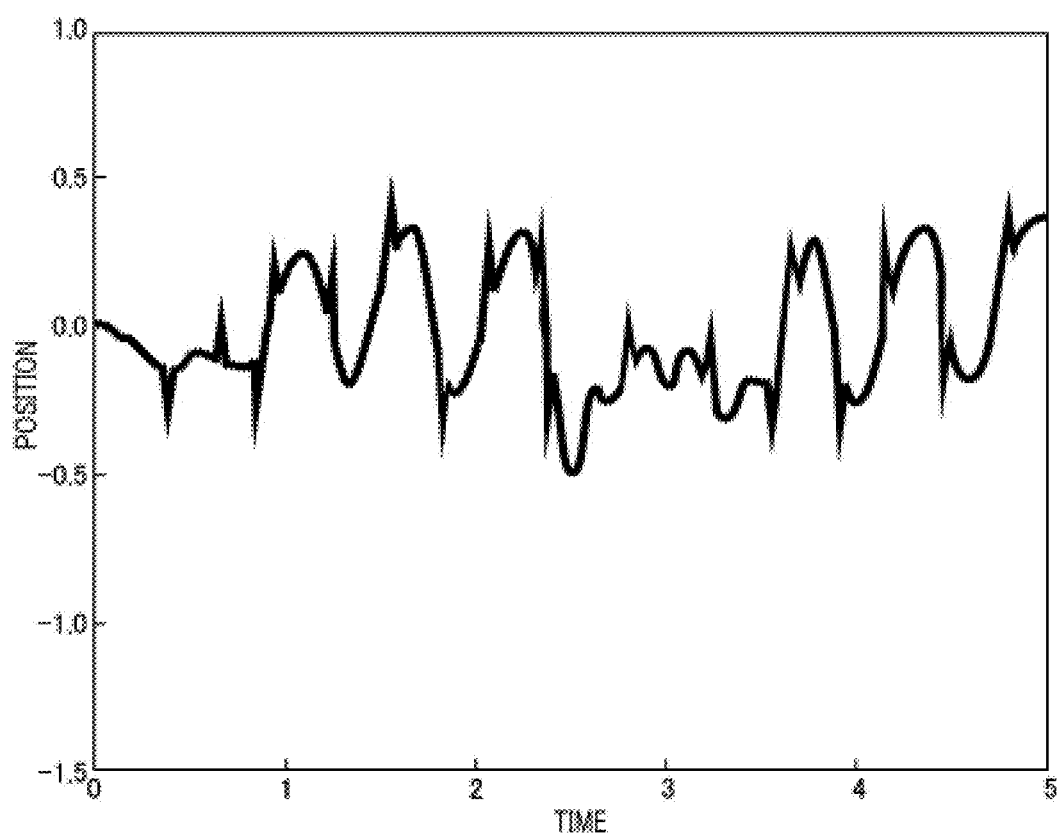
FIG. 4 is a view showing an example of manual data received by the specifying data generating apparatus 110.

FIG. 4 is a view showing an example of the specifying data generated as a result of the coordinate system being converted as described above. The shown specifying data corresponds to data in which one of components of a position coordinate value of the target object operated by a human is recorded in association with time. As shown, this specifying data contains the motions of the target object due to the human operation that are faithfully recorded, and thus includes noise components whose value largely varies in a short period.

Again referring to FIG. 3, the coarse-graining unit 115 coarse-grains the specifying data acquired by the acquiring unit 111 (step S103). The coarse-graining includes data processing of discretizing a continuous physical quantity defined in a certain variable space, with an arbitrary unit scale of the variable. In other words, the coarse-graining can be referred to also as an operation of projection from a high-resolution space to a low-resolution space. The coarse-graining of the specifying data can be calculated, for example, by averaging physical quantities within a temporal unit scale.

Figure 5:
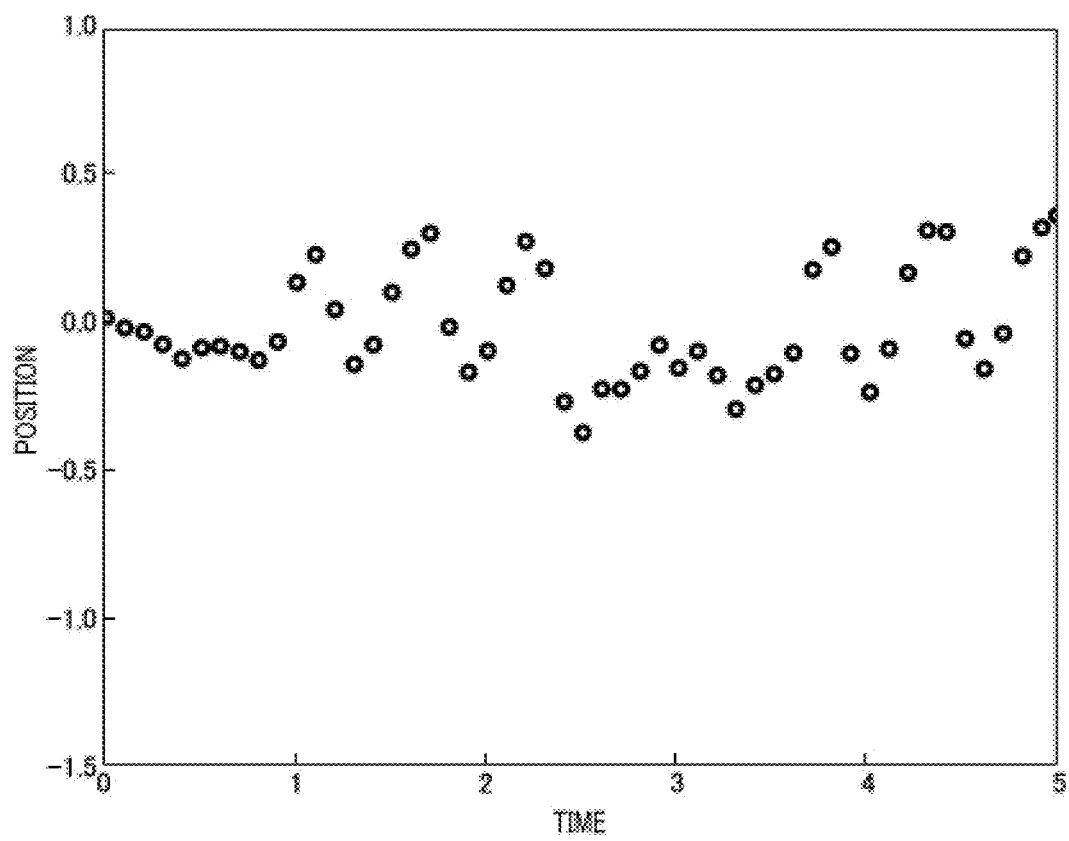
FIG. 5 is a graph illustrating an operation of a coarse-graining unit 115.

FIG. 5 is a graph illustrating a coarse-grained state of the specifying data shown in FIG. 4. In the coarse-grained specifying data, the position and the posture of the end effector 302 are chronologically stored every 100 ms, for example. FIG. 5 shows one of components of the coarse-grained specifying data. In the coarse-grained specifying data, an amount of information is reduced and the noise components that vary in a short period are removed.

Again referring to FIG. 3, the specifying data coarse-grained by the coarse-graining unit 115 is interpolated by the interpolating unit 116 (step S104). A temporal resolution of the specifying data discretized by the coarse-graining in step S103 may be lower than a temporal resolution observed when the robot 300 is controlled by the controller 200. Therefore, increasing the temporal resolution of the specifying data to an upper limit, for example, about 8 ms, at which the robot can be controlled by interpolation process forms specifying data with which the robot 300 can be smoothly controlled. The interpolation process on the specifying data can be carried out by spline interpolation, for example.

Figure 6:
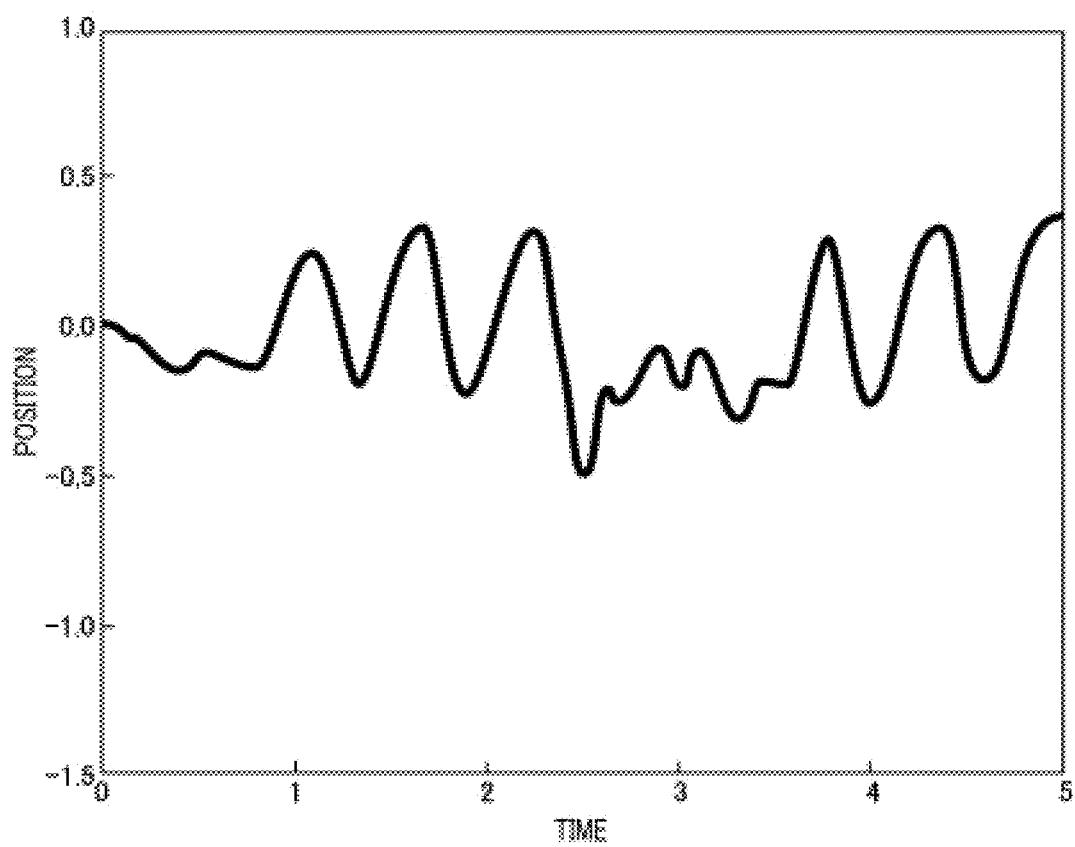
FIG. 6 is a graph illustrating an operation of an interpolating unit 116.

FIG. 6 is a graph illustrating specifying data interpolated so as to have a maximum resolution that can be received by the controller 200. As shown, in a waveform showing a temporal change of the position of the target object, the noise components have been removed, and the waveform has a high temporal resolution.

It should be noted that the graphs shown in FIGS. 4, 5 and 6 illustrate one component of information indicative of the position of the end effector 302, of the specifying data. Therefore, in a case where the specifying data indicates a spatial position of the end effector 302, the above process is carried out for each of three variables $(X, Y, Z)$ of a stereographic orthogonal coordinate, for example.

In addition, the specifying data indicative of motions of the end effector 302 having six degrees of freedom also includes components $(R_X, R_Y, R_Z)$ indicative of a temporal change in the posture of the end effector 302. Therefore, the above-described series of processes are carried out also for the posture of the end effector 302. The components $(R_X, R_Y, R_Z)$ indicative of the posture of the end effector 302 are indicated by Euler angles, for example.

However, the posture represented by Euler angles individually processes the components ($R_x$, $R_y$, $R_z$) indicative of the posture of the end effector 302, for example, for each of axes x, y and z. For this reason, for example, in a case where an amount of rotation around a certain axis is 90°, two of three rotational degrees of freedom overlap and one of the rotational degrees of freedom is lost, so that gimbal lock may occur.

Therefore, the components ($R_x$, $R_y$, $R_z$) of the specifying data that are indicated by Euler angles may be converted into a quaternion and handled by a known method. The posture of the end effector 302 by the quaternion is expressed in a form like the following equation 1. Where, i, j and k are imaginary units, respectively.

$$q = w + x\hat{i} + y\hat{j} + z\hat{k} = w + v \quad \text{(equation 1)}$$

Figure 7:
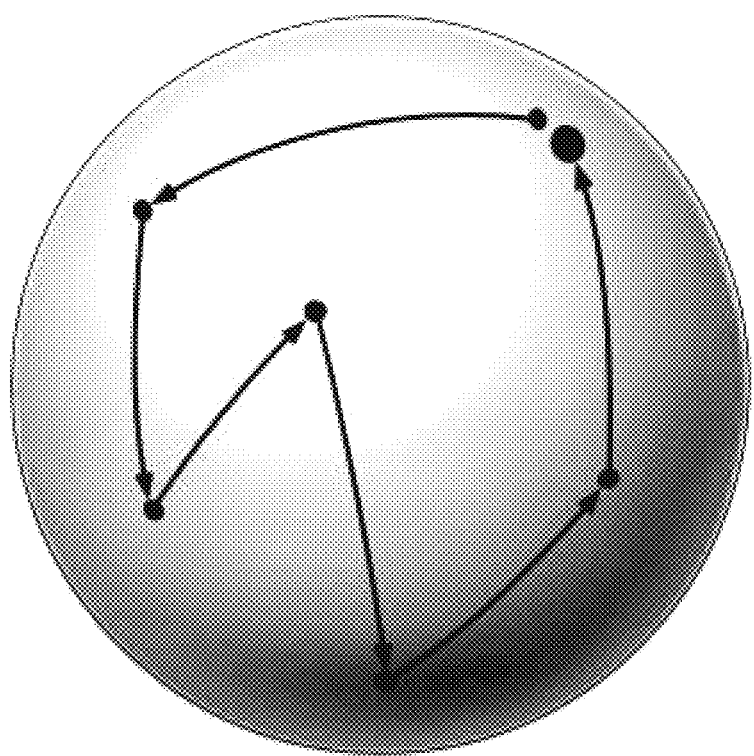
FIG. 7 is a view showing an example of a change in posture of an end effector 302.

FIG. 7 is a view showing a concept of the posture of the end effector 302 expressed by the quaternion. The shown data corresponds to the coordinate system converted in step 102 and then coarse-grained in step S103. Black points on a spherical surface in the figure indicate the posture of the end effector 302 in the specifying data, as positions on the spherical surface.

In this way, converting the data indicative of the posture of the end effector 302 from Euler angles into the quaternion can reduce the processing loads of coarse-graining, interpolation and the like. In addition, the processing loads of synthesis of rotations of the end effector 302, and the like are also reduced.

Figure 8:
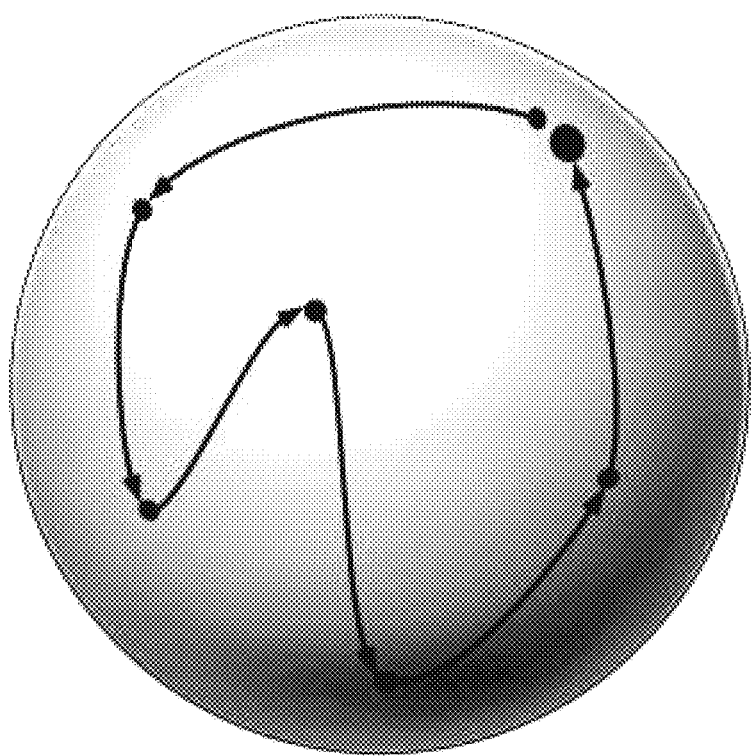
FIG. 8 is a graph illustrating an operation of an interpolating unit 116.

FIG. 8 is a view schematically showing the specifying data about the posture of the end effector 302 interpolated in step S103. Converting the specifying data about the posture of the end effector 302 into the quaternion, as described above allows for interpolation of the specifying data by spherical quadrilateral interpolation according to the following equation 2, so that the number of steps of calculation as to the posture of the end effector 302 can be reduced. It should be noted that in the equation 2, Squad means spherical quadrilateral interpolation and Slerp means spherical linear interpolation. In addition, the subscript of the quaternion q indicates that i−1, I, i+1 and i+2 change in this arrangement order, and h is a parameter obtained from time.

$$\text{Squad}([q_{i-1} : q_{i+2}], h) = \quad \text{(equation 2)}$$
$$\text{Slerp}[\text{Slerp}(q_i, q_{i+1}, h), \text{Slerp}((s_i, s_{i+1}, h)), 2h(1-h)]$$

note that, $$0 < h < 1,$$

$$s_i = q_i \exp\left(-\frac{\ln(q_i^{-1} q_{i+1}) + \ln(q_i^{-1} q_{i-1})}{4}\right)$$

In this way, in the acquiring unit 111 of the specifying data generating apparatus 110, the components (x, y, z) indicative of the position of the end effector 302 and the components ($R_x$, $R_y$, $R_z$) indicative of the posture of the end effector 302 in the manual data are each processed, so that the specifying data indicative of the position (x, y, z) and the posture (q) of the end effector 302 in the coordinate system of the controller 200 configured to specify motions of the robot 300 is generated. In addition, in the specifying data generated by the specifying data generating apparatus 110, the noise components have been removed, and the specifying data has a high resolution.

In the meantime, the motions of the robot 300 have a predetermined tolerance. The tolerance is determined stepwise according to purposes, such as a range, the excess of which by motions damages the robot 300, a range in which a durability of the robot 300 is lowered and a range in which the robot 300 can be continuously operated. In addition, in some cases, tolerances of the arm portion 301 and the end effector 302 of the robot 300 may be individually determined. Further, the tolerance of the robot 300 is provided not only for the position and posture of the end effector 302 but also for acceleration, speed and the like observed when the robot 300 operates.

In addition, in the robot system 10, when motions exceeding the tolerance are specified for the robot 300, the robot 300 suspends its operation to avoid a damage of the robot 300 itself, a danger around the robot 300, and the like, for example. At this time, in a case where a target that is operated by the robot 300 is a compound, a living thing, a biological material or the like that continues to change over time, a suspension of the operation of the robot 300 may result in a deterioration of the target object.

Therefore, in general, the robot 300 is preferably configured to operate with motions that do not exceed the tolerance according to a purpose of use. However, the specifying data generated up to step S104 is data generated in correspondence to the manual data and may include a value for instructing the robot 300 to move beyond the tolerance.

Again referring to FIG. 3, when the robot 300 operates according to the specifying data generated in step S104, the generating unit 112 checks whether the motions of the robot 300 exceed the tolerance set for the robot 300 (step S105). Here, the determination as to whether the motions of the end effector 302 deviate from the tolerance can be made by determining whether a value of the specifying data for specifying the motions of the end effector 302 exceeds a predetermined threshold.

As for the threshold, in a case where there is a value known in advance as the specifications of the robot 300, the value may be used. In addition, in a case where the specifications of the robot 300 constituting the robot system 10 is not apparent, a value of the specifying data obtained when the robot is actually operated under intended use conditions and the robot 300 is stopped due to deviation from the tolerance may be used as the threshold.

When it is determined in step S105 that a period occurs during which the motions of the robot 300 exceed the threshold (step S105: YES), the generating unit 112 corrects the specifying data by the correcting unit 113 with respect to at least the period for which it has been determined that the motions of the robot 300 deviate from the tolerance (step S106). The correcting unit 113 corrects the specifying data so that a period does not occur during which the motions of the robot 300 exceed the tolerance. A procedure of correcting the specifying data by the correcting unit 113 will be described later with reference to FIG. 9 and thereafter.

When it is determined in step S105 that the specifying data does not exceed the threshold and thus the period during which the motions of the robot 300 deviate from the tolerance has not occurred (step S105: NO) and when the correction of the specifying data in step S106 is completed with respect to the period during which the motions of the robot 300 deviate from the tolerance, the generating unit 112 checks whether an operation time of the robot 300 according to the entire specifying data including the corrected period exceeds a time limit (step S107).

For example, as a result of the specifying data being corrected, an operation time of the robot 300 according to the specifying data may be further extended than the operation time of the human, which is a source of the manual data. In addition, due to the extension of the operation time, it may be predicted that a chemical reaction excessively proceeds or a living thing or a biological material is deteriorated in a target object that is operated by the robot 300. Such specifying data cannot be adopted for industrial purposes even when the motions of the end effector 302 do not exceed the tolerance.

Therefore, the warning unit 117 compares the generated and corrected specifying data with a predetermined threshold time, and when the operation time according to the corrected specifying data exceeds the time limit (step S107: YES), the generating unit 112 determines that it is not possible to generate appropriate specifying data, and causes the warning unit 117 to issue an warning (step S109) to end the process. The warning by the warning unit 117 may be recorded in a log file or may generate a video, a sound, a light or the like to an outside through a user interface. This allows the user of the robot system 10 to recognize that it was not possible to generate the specifying data with which the motions of the end effector 302 do not deviate from the tolerance and to try another method of correcting the specifying data, and the like.

On the other hand, in step S107, when the corrected specifying data does not exceed the time limit (step S107: NO), the generating unit 112 transmits the generated specifying data to the controller 200 (step S108), and ends the process. This brings the controller 200 into a state where it can drive the robot 300 with the specifying data which corresponds to the manual data and with which the motions do not deviate from the tolerance.

As described above, as for the specifying data generated by the generating unit 112, when the controller 200 drives the robot 300 according to the specifying data, it can be checked in step S105 shown in FIG. 3 whether the motions of the end effector 302 exceed the predetermined threshold. When it is determined that the specifying data exceeds the threshold and the motions of the end effector 302 operated according to the specifying data deviate from the tolerance (step S105: YES), correction of the specifying data (step S106) is started.

Figure 9:
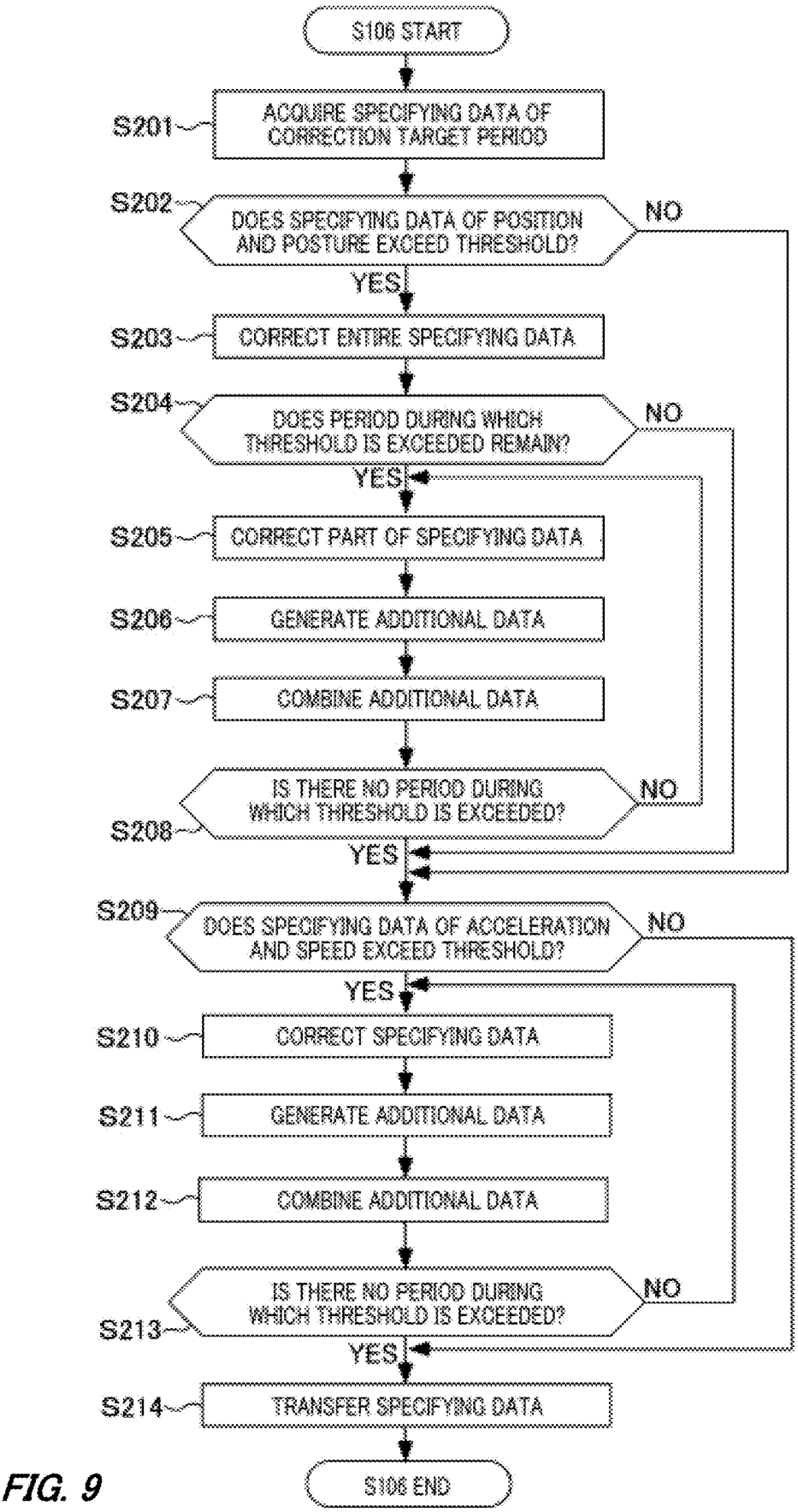
FIG. 9 is a flow diagram showing an operation of a correcting unit 113.

FIG. 9 is a flow diagram showing an example of a procedure where the correcting unit 113 corrects the specifying data in step S106. When step S106 starts, the correcting unit 113 acquires the specifying data including the period for which it has been determined that the motions of the end effector 302 deviate from the tolerance (step S201).

Then, the correcting unit 113 determines whether the deviation, from the tolerance, in the motions of the end effector 302 operated according to the specifying data not having been corrected is as to the position or posture of the end effector 302 (step S202). When there is no period during which the position of the end effector 302 exceeds the threshold (step S202: NO), the correcting unit 113 advances the process to step S209, which will be described later.

Figure 10:
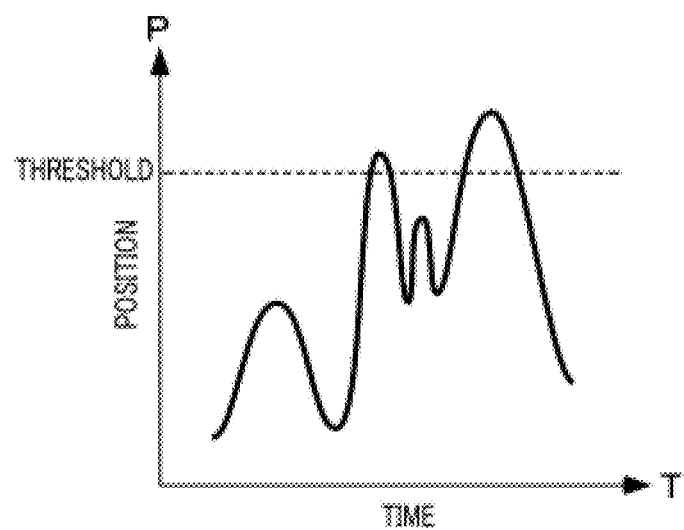
FIG. 10 is a graph showing an example of a position specified by specifying data.

FIG. 10 shows an example of the specifying data including the period for which it has been determined that the position (X, Y, Z) of the end effector 302 deviates from the tolerance.

The shown data is data indicative of positions of the end effector 302. FIG. 10 shows a curve indicating that one of coordinate values indicative of the position of the end effector 302 changes over time. In addition, the shown curve changes while exceeding the threshold at at least two places.

FIG. 9 is again referred to. When it is determined in step S202 that the end effector 302 deviates from the tolerance regarding the position (step S202: YES), the correcting unit 113 entirely offsets the value of the specifying data for specifying the position or posture in the specifying data, and performs a correction of reducing a movement amount of the end effector 302 generated as a result of a position being specified, as shown with an arrow $X_1$ in the figure (step S203).

Figure 11:
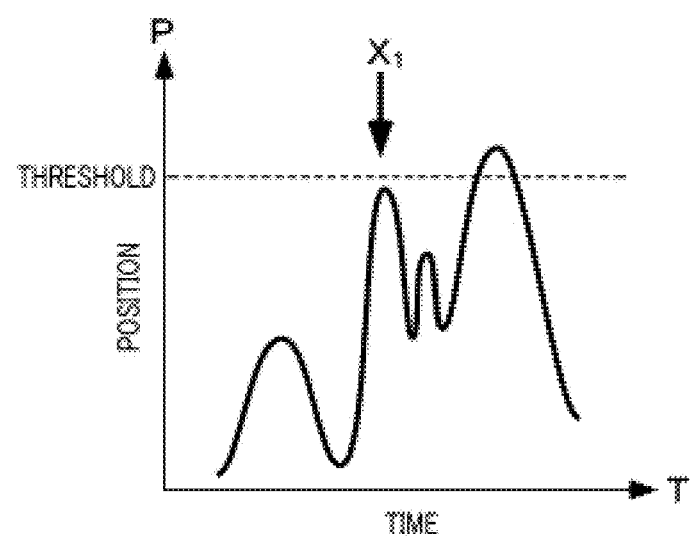
FIG. 11 is a graph illustrating a correction process on the specifying data.

FIG. 11 is a graph showing the process of step S203 for the specifying data. The curve shown in the shown graph is completely the same as that shown in FIG. 10, in terms of the waveform itself. However, since the values are uniformly reduced as a whole, one of two peaks exceeding the threshold is smaller than the threshold. This correction reduces the number of times the position of the end effector 302 of the robot 300 operated according to the specifying data deviates from the tolerance.

FIG. 9 is again referred to. Then, the correcting unit 113 checks, for the specifying data after the correction in step S203, whether a period during which the position of the end effector 302 specified by the specifying data exceeds the predetermined threshold remains in the motions of the end effector 302 operated according to the specifying data (step S204). In step S204, the same threshold as the threshold used in step S202 can be used. When there is no period during which the position of the end effector 302 exceeds the threshold (step S204: NO), the correcting unit 113 advances the process to step S209, which will be described later.

In step S204, when the period remains during which the threshold is exceeded (step S204: YES), the correcting unit 113 offsets the component, which indicates the position of the end effector 302, for a part of the specifying data including the corresponding period, and performs a correction of further reducing the movement amount of the end effector 302 generated as a result of the position being specified (step S205). Thereby, the values of the data indicative of the position of the end effector 302 shown in FIG. 10 are further reduced, so that the period during which the threshold is exceeded can be further reduced.

Figure 12:
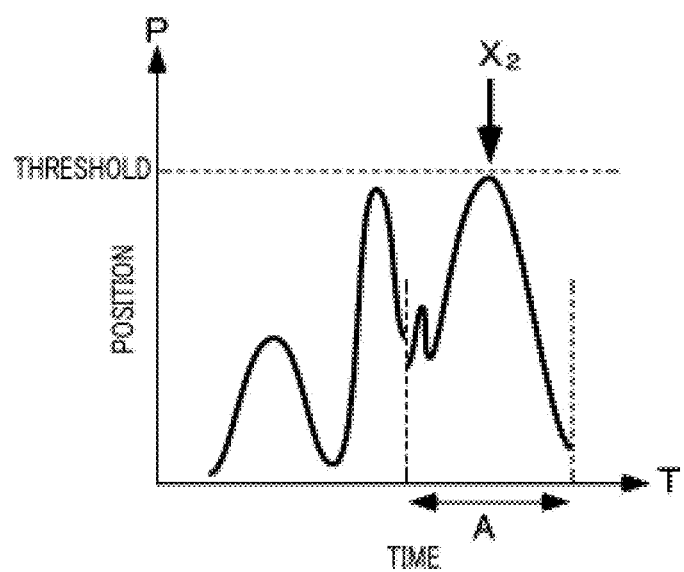
FIG. 12 is a graph illustrating another correction process on the specifying data.

FIG. 12 is a graph showing a state where the values are reduced with respect to a period A of a part of the specifying data indicative of the position of the end effector 302 by the above correction, as shown with an arrow $X_2$ in the figure. As shown, since the values of the specifying data are all made smaller than the threshold by the correction, the period during which the position of the end effector 302 deviates from the tolerance is eliminated. Note that, since the values are reduced with respect to the period A of a part of the specifying data, the change in value of the specifying data does not continue at boundaries between the corrected period A and other periods.

FIG. 9 is again referred to. The correcting unit 113 generates additional data to the corrected data in which the discontinuous parts are generated due to the correction as described above (step S206). The additional data that is here generated is data that is inserted between the period A and periods other than the period A so as to smoothly continue the change in specifying data in the period A and the change in specifying data in the periods other than the period A.

Figure 13:
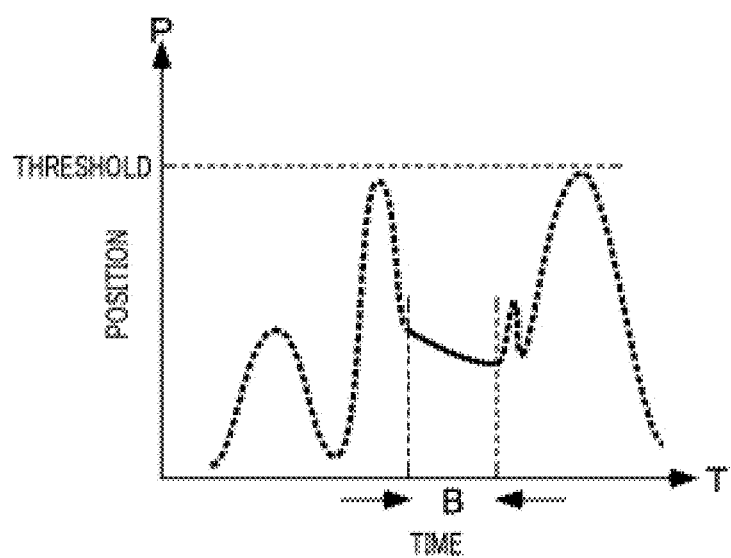
FIG. 13 is a graph illustrating generation of additional data.

FIG. 13 is a view showing an example of the additional data that is generated in step S206. In the figure, a left end in the figure of the additional data shown with a solid line in a period B has a value and an inclination that are the same as the termination of the specifying data before the period A. In addition, a right end in the figure of the additional data has a value and an inclination that are the same as a starting point of the specifying data in the period A.

Further, the right end and the left end of the additional data are interpolated and connected by a curve smoothly continuing the right end and the left end. The additional data drawing such curve may be generated by spline interpolation or hyperbolic tangent interpolation that is executed by the correcting unit 113.

FIG. 9 is again referred to. The correcting unit 113 combines the additional data generated in step S206 with the specifying data that exists from the beginning (step S207). When combining the additional data, the position of the specifying data located chronologically behind is temporally moved according to a temporal length of the generated additional data to provide a blank period corresponding to the period B, and the additional data is inserted in the blank period. It should be noted that the blank period corresponding to the period B is about twice as long as one peak in the waveform of the specifying data. Specifically, if a length between a point on any valley and a point adjacent to the point is about one second, the blank period corresponding to the period B is about two seconds.

Figure 14:
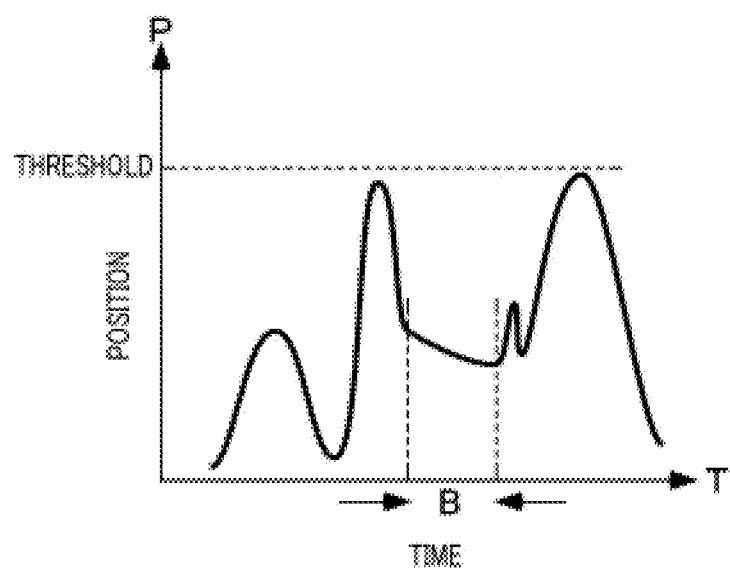
FIG. 14 is a graph showing an example of corrected specifying data.

FIG. 14 is a view showing the specifying data combined with the additional data as described above. As shown, the specifying data combined with the additional data arranged in the period B is smoothly connected as a whole. In addition, this specifying data does not include a period during which the threshold is exceeded. Therefore, when the controller 200 drives the robot 300 by using the shown specifying data, the end effector 302 of the robot 300 is prevented from moving deviating from the tolerance. For this reason, the robot 300 does not suspend the operation unintentionally.

It should be noted that, in the above example, the case where the components for specifying the position of the end effector 302 of the specifying data are corrected has been described. However, also for the components for specifying the posture of the end effector 302 of the specifying data, a change amount of the posture can be similarly corrected for reduction to prevent the end effector 302 from deviating from the tolerance. Note that, in this case, the spherical quadrilateral interpolation, not the spline interpolation, is executed. Also, in this case, since the values indicative of the posture of the end effector 302 have been converted into the quaternion, the number of steps of the data processing can be reduced.

Note that, the controller 200 that finally receives the specifying data may have a specification where the posture of the end effector 302 is specified by Euler angles to drive the robot 300. In this case, in the specifying data generating apparatus 110, the values of the quaternion indicative of the posture of the end effector 302 may be converted into Euler angles and used as the specifying data that is transmitted to the controller 200.

In addition, when the additional data is added to the specifying data, the entire temporal length of the specifying data is also extended. For this reason, a time necessary until the operation on the target object by the robot 300 is completed is also extended. Therefore, in step S107 shown in FIG. 3, when the operation time of the robot 300 by the series of specifying data exceeds the time limit, the specifying data corrected as described above cannot be used. In this case, for example, the method of correcting the specifying data may be changed to generate another specifying data that is to be transferred to the controller 200.

FIG. 9 is again referred to. Subsequently, the correcting unit 113 checks whether there is no period during which the values of the components for specifying the position of the specifying data exceed the threshold (step S208). In step S208, when it is determined that the period during which the threshold is exceeded remains in the components for specifying the position (step S208: NO), the correcting unit 113 returns the process to step S205, and repeats the series of correction processes from step S205 to step S208.

When it is determined in step S208 that no period during which the threshold is exceeded remains in the components for specifying the position (step S208: YES), the correcting unit 113 assumes that the correction for the components, which specify the position, of the specifying data is ended, and advances the process to step S209.

The correcting unit 113 checks whether the moving speed, which occurs in the end effector 302 when the robot 300 operates according to the specifying data, deviates from the tolerance (step S209). The determination as to whether the moving speed of the end effector 302 deviates from the tolerance can be made by determining whether the moving speed of the end effector 302, which occurs by the specifying data, exceeds a threshold predetermined for the moving speed of the end effector 302.

When there is no period during which the moving speed of the end effector 302 exceeds the threshold (step S209: NO), the correcting unit 113 advances the process to step S214, which will be described later. When there is a period during which the moving speed of the end effector 302 exceeds the threshold (step S209: YES), the correcting unit 113 corrects the specifying data of the corresponding period (step S210).

Figure 15:
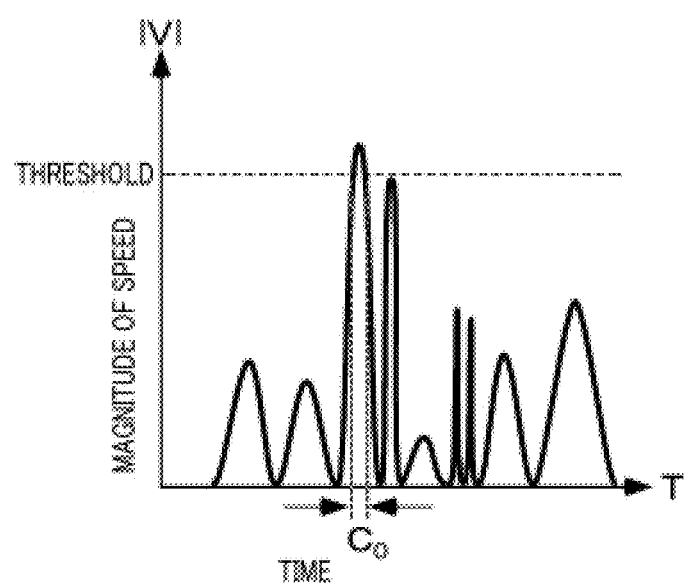
FIG. 15 is a view showing an example of a change in moving speed of the end effector 302.

FIG. 15 is a graph showing a temporal change in absolute value of the moving speed of the end effector 302. In the shown graph, a curve indicative of the change in value of the moving speed includes a period $C_0$ during which the moving speed exceeds the threshold. It should be noted that, in the shown example, an absolute value |V| of the square root of a sum of squares of the speed components ([dx/dt], [dy/dt], [dz/dt]) in the three-dimensional space, which is calculated as shown in the following equation 3, is used as a magnitude of the speed of the end effector 302 and compared with the threshold.

$$|V| = \sqrt{\left(\frac{dx}{dt}\right)^2 + \left(\frac{dy}{dt}\right)^2 + \left(\frac{dz}{dt}\right)^2} \quad \text{(equation 3)}$$

Again referring to FIG. 9, the correcting unit 113 corrects the specifying data with respect to the period $C_0$ during which the moving speed exceeds the threshold (step S210). Here, the specifying data is corrected by extending the period $C_0$ in a time direction.

Figure 16:
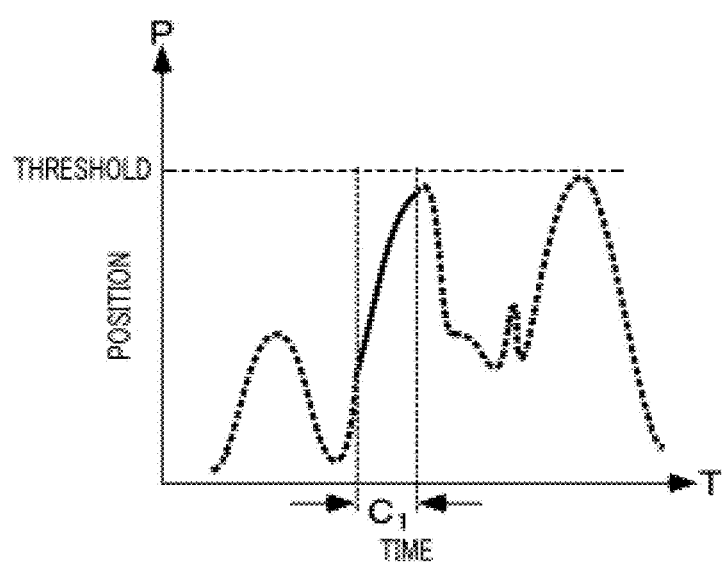
FIG. 16 is a graph illustrating a correction process on the specifying data.

FIG. 16 is a graph illustrating the correction on the specifying data by the correcting unit 113, as described above, showing a temporal change in position of the end effector 302 in the specifying data. As shown, the period $C_0$ during which the moving speed of the end effector 302 exceeds the threshold is extended in the time direction and becomes a period $C_1$. Thereby, an inclination of the corrected specifying data shown with the solid line in the figure becomes gentle. For this reason, the moving speed of the end effector 302 by the specifying data in the period $C_1$ is lowered. Note that, since the period $C_1$ is further extended than the period $C_0$, the movement amount of the end effector 302 in the period $C_1$ is equal to the movement amount of the end effector 302 in the period $C_0$ of the specifying data not having been corrected.

It should be noted that the specifying data in the period $C_0$ is temporally extended, so that the temporal resolution of the specifying data may be insufficient in the period $C_1$. In this case, like the process of the step S104 shown in FIG. 3, the specifying data can be interpolated to compensate for the resolution.

Note that, in the specifying data formed simply by combining the specifying data in the corrected period $C_1$ with the specifying data in a period not corrected, the moving speed of the end effector 302 rapidly changes at boundaries of both the periods. For this reason, at the boundaries, the acceleration of the end effector 302 significantly increases.

Therefore, again referring to FIG. 9, the correcting unit 113 generates additional data that is inserted to the boundaries with the period $C_1$, so as to smoothly continue the specifying data in the period $C_1$ and the specifying data in another period (step S211). Note that, at the boundaries of the temporally extended period $C_1$ and other periods, the moving speed of the end effector 302 becomes discontinuous but the position of the end effector 302 does not change. Therefore, the additional data generated by the correcting unit 113 smoothly continues the curve of the specifying data in periods $D_1$ and $D_2$ with a limited range including a boundary between the period $C_1$ and another period. It should be noted that the periods $D_1$ and $D_2$ can be set to about triple as long as the interval for acquiring the manual data. For example, in a case where the manual data is recorded every 8 ms, the periods $D_1$ and $D_2$ are preferably set to 24 ms.

Figure 17:
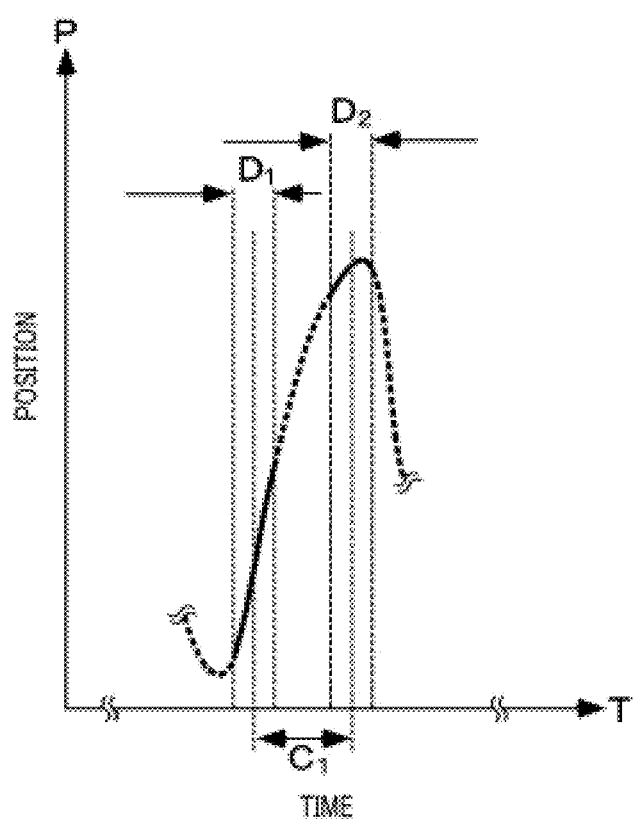
FIG. 17 is a graph illustrating generation of additional data.

FIG. 17 is a view showing an example of the additional data that is generated in step S206. In the figure, at both ends in the figure of the additional data shown with the solid lines in the periods $D_1$ and $D_2$, an inclination at an end portion of the additional data shown with the solid line matches an inclination at an end portion of the specifying data shown with a dashed line. In addition, in the period of each of the periods $D_1$ and $D_2$, the change of the data smoothly continues. The additional data drawing such curve may also be generated by the spline interpolation that is executed by the correcting unit 113.

Again referring to FIG. 9, the correcting unit 113 combines the additional data generated in step S211 with other periods of the specifying data that exists from the beginning (step S212). When combining the additional data, periods corresponding to the periods $D_1$ and $D_2$ are provided, and the specifying data in the periods is deleted and is replaced with the additional data.

Figure 18:
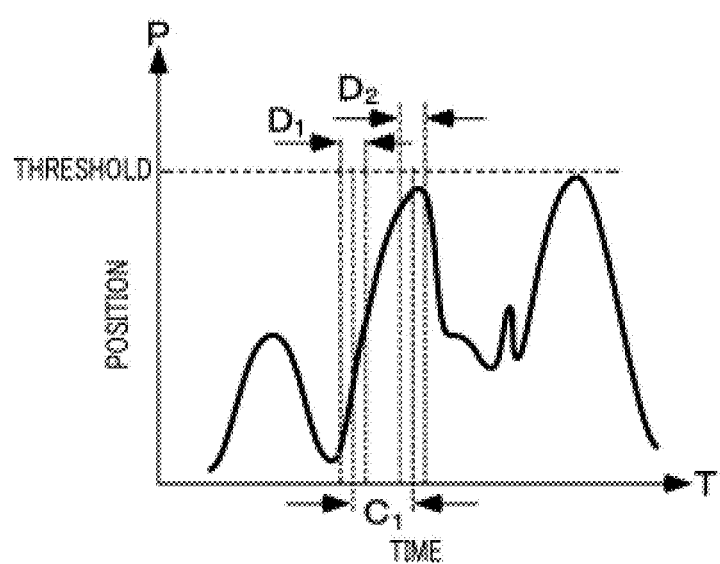
FIG. 18 is a graph showing an example of corrected specifying data.

FIG. 18 is a view showing the specifying data combined with the additional data as described above. As shown, the specifying data in the corrected period $C_1$ is combined with the specifying data in periods not corrected, via the additional data arranged in the periods $D_1$ and $D_2$, so that the specifying data smoothly continuing as a whole is formed. Since the period during which the threshold is exceeded is not included in the specifying data, when the controller 200 drives the robot 300 by using the shown specifying data, the end effector 302 of the robot 300 is prevented from causing motions of the moving speed that deviates from the tolerance. Therefore, it is also prevented that the robot 300 suspends the operation unintentionally due to motions deviating from the tolerance.

FIG. 9 is again referred to. Then, the correcting unit 113 checks, for the corrected specifying data formed in step S212, whether the period, during which the moving speed of the end effector 302 exceeds the threshold, has disappeared in the motions of the end effector 302 operated according to the corrected specifying data (step S213). In step S213, the same threshold as the threshold used in step S209 can be used.

When it is determined in step S213 that the period during which the moving speed of the end effector 302 exceeds the threshold has not disappeared (step S213: NO), the correcting unit 113 returns the process of the correcting unit 113 to step S210, and repeats the series of correction processes from step S210 to step S212. In addition, when it is determined in step S213 that no period during which the moving speed of the end effector 302 exceeds the threshold remains in the components for specifying the position (step S213: YES), the correcting unit 113 assumes that the correction of the specifying data as to the moving speed is completed, and advances the process to step S214.

The above example has described the case where the period during which the moving speed of the end effector 302 exceeds the tolerance is included in the specifying data. However, in the specifying data, also for a rotating speed of the end effector 302 when the posture of the end effector 302 changes, similarly, by correcting the components of the specifying data for specifying the posture of the end effector 302, the motions of the end effector 302 that deviate from the tolerance can be prevented.

In this case, since the values indicative of the posture of the end effector 302 have been converted into the quaternion, the number of steps of the data processing can be reduced. Note that, the controller 200 that finally receives the specifying data may have a specification where the posture of the end effector 302 is specified by Euler angles to drive the robot 300. In this case, in the specifying data generating apparatus 110, the values of the quaternion indicative of the posture of the end effector 302 may be converted into Euler angles and used as the specifying data that is transmitted to the controller 200.

Figure 19:
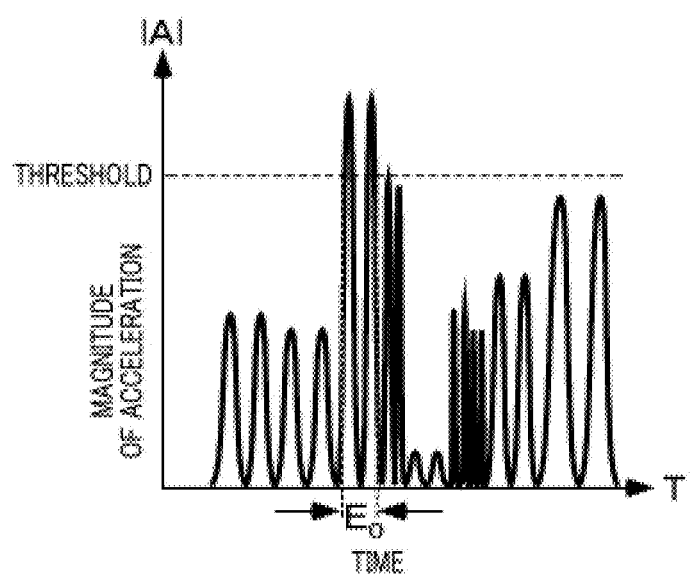
FIG. 19 is a view showing an example of a change in acceleration of the end effector 302.

FIG. 19 is a graph showing a temporal change in absolute value of the acceleration that occurs when the end effector 302 moves. In the shown graph, a curve indicative of the change in value of the acceleration includes a period $E_0$ during which the acceleration exceeds the threshold. It should be noted that, in the shown example, an absolute value |A| of the square root of a sum of squares of the acceleration components ($[d^2x/dt^2]$, $[d^2y/dt^2]$, $[d^2z/dt^2]$) in the three-dimensional space, which is calculated as shown in the following equation 4, is used as a magnitude of the acceleration of the end effector 302 and compared with the threshold.

$$|A| = \sqrt{\left(\frac{d^2x}{dt^2}\right)^2 + \left(\frac{d^2y}{dt^2}\right)^2 + \left(\frac{d^2z}{dt^2}\right)^2} \quad \text{(equation 4)}$$

Therefore, the correcting unit 113 corrects the specifying data with respect to the period $E_0$ during which the acceleration A exceeds the threshold, in step S210 shown in FIG. 9. The specifying data is corrected by extending the period $E_0$ in the time direction.

Figure 20:
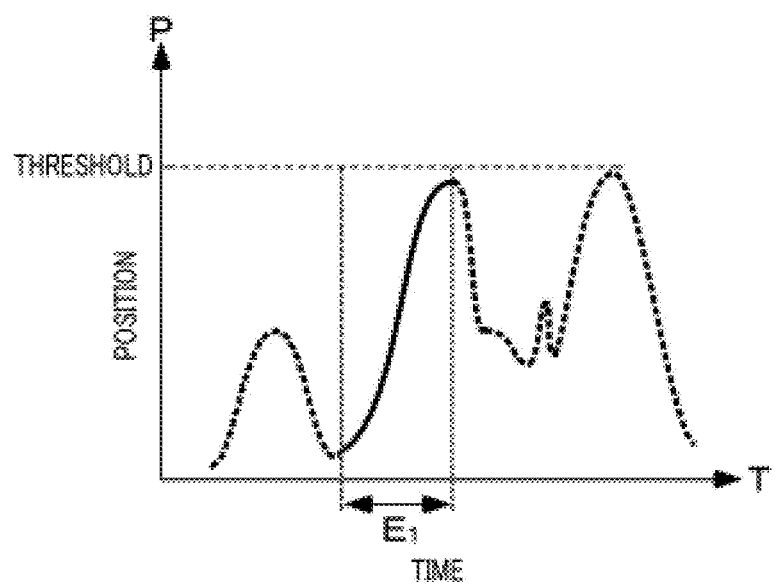
FIG. 20 is a graph illustrating a correction process on the specifying data.

FIG. 20 is a graph illustrating the correction on the specifying data by the correcting unit 113, as described above, showing a temporal change in position of the end effector 302 specified by the specifying data. As shown, by extending the period $E_0$, during which the acceleration of the end effector 302 exceeds the threshold, in the time direction, a period $E_1$ including the corrected specifying data is formed. Thereby, an inclination of the corrected specifying data shown with the solid line in the figure becomes gentle. For this reason, the acceleration of the end effector 302 by the specifying data in the period $E_1$ is lowered. Note that, since the period $E_1$ is further extended than the period $E_0$, the change amount of the position of the end effector 302 in the entire period $E_1$ is equal to the change amount of the position of the end effector 302 in the period $E_0$ of the specifying data not having been corrected.

It should be noted that the specifying data in the period $E_0$ is temporally extended, so that the temporal resolution of the specifying data may be insufficient in the period $E_1$. In this case, like the process of the step S104 shown in FIG. 3, the specifying data can be interpolated to compensate for the resolution.

Here, in the specifying data formed simply by combining the specifying data in the corrected period $E_1$ with the specifying data in a period not corrected, the acceleration of the end effector 302 rapidly changes at boundaries of both the periods. For this reason, at the boundaries, the acceleration of the end effector 302 significantly increases.

Therefore, in step S211 shown in FIG. 9, the correcting unit 113 generates additional data that is inserted to the boundaries with the period $E_1$, so as to smoothly continue the specifying data in the period $E_1$ and the specifying data in other periods. Note that, at the boundaries of the temporally extended period $E_1$ and other periods, the acceleration of the end effector 302 becomes discontinuous but the position of the end effector 302 does not change.

Therefore, the additional data generated by the correcting unit 113 smoothly continues the curve of the specifying data in periods $F_1$ and $F_2$ with a limited range including a boundary between the period $E_1$ and another period. It should be noted that the periods $F_1$ and $F_2$ can be set to about triple as long as the interval for acquiring the manual data. For example, in a case where the manual data is recorded every 8 ms, the periods $F_1$ and $F_2$ are preferably set to 24 ms.

Figure 21:
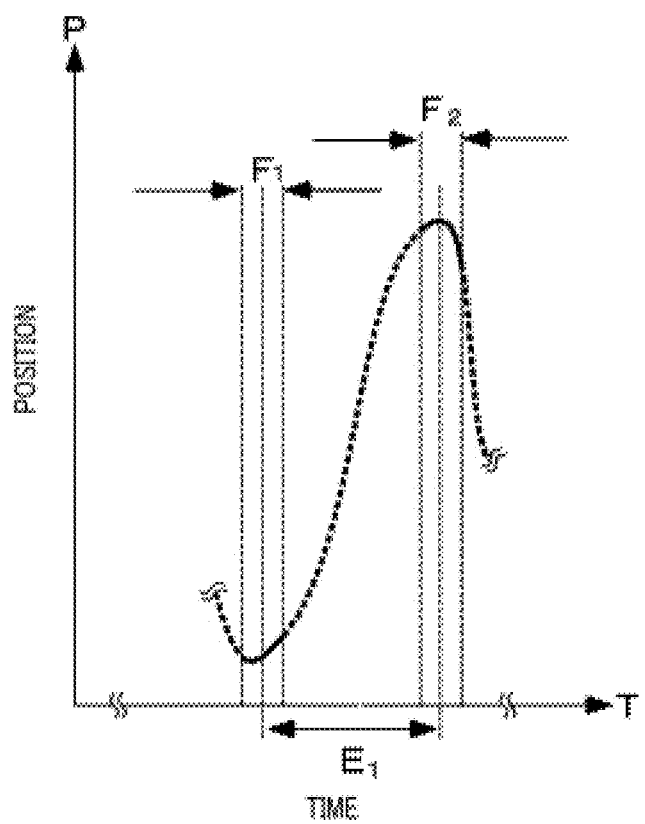
FIG. 21 is a graph illustrating generation of additional data.

FIG. 21 is a view showing an example of the additional data that is generated in step S206 shown in FIG. 9. In the figure, at both ends in the figure of the additional data shown with the solid lines in the periods $F_1$ and $F_2$, an inclination at an end portion of the additional data shown with the solid line matches an inclination at an end portion of the specifying data shown with a dashed line. In addition, in the period of each of the periods $F_1$ and $F_2$, the change of the data smoothly continues. The additional data drawing such curve may also be generated by the spline interpolation that is executed by the correcting unit 113.

Then, in step S212 of FIG. 9, the correcting unit 113 combines the additional data generated in step S211 with other periods of the specifying data that exists from the beginning. When combining the additional data, periods corresponding to the periods $F_1$ and $F_2$ are provided, and the specifying data in the periods is deleted and is replaced with the additional data.

Figure 22:
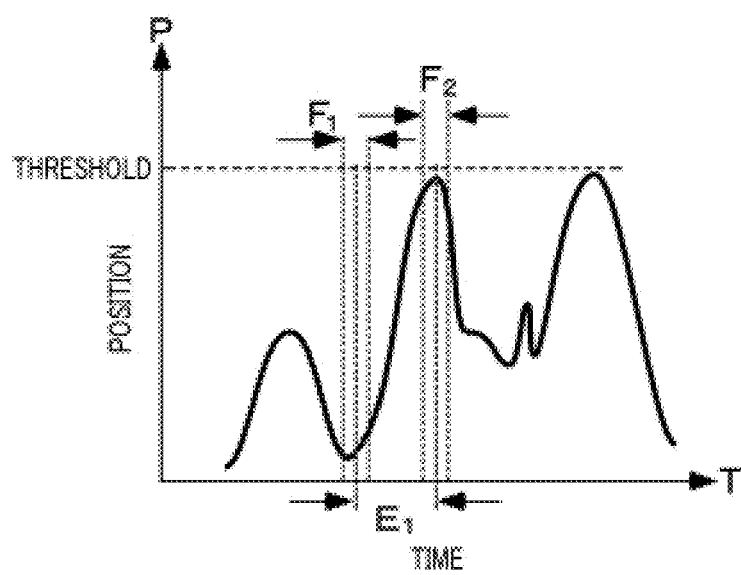
FIG. 22 is a graph showing an example of corrected specifying data.

FIG. 22 is a view showing the specifying data combined with the additional data as described above. As shown, the specifying data in the corrected period $F_1$ is combined with the specifying data in periods not corrected, via the additional data arranged in the periods $F_1$ and $F_2$, so that the specifying data smoothly continuing as a whole is formed. Since the period during which the threshold is exceeded is not included in the specifying data, when the controller 200 drives the robot 300 by using the shown specifying data, the end effector 302 of the robot 300 is prevented from causing motions of the acceleration that deviates from the tolerance. Therefore, it is also prevented that the robot 300 suspends the operation unintentionally due to motions deviating from the tolerance.

Thereafter, in step S213 of FIG. 9, the correcting unit 113 checks, for the corrected specifying data formed in step S212, whether the period, during which the acceleration of the end effector 302 exceeds the threshold, has disappeared in the motions of the end effector 302 operated according to the corrected specifying data. In step S213, the same threshold as the threshold used in step S209 can be used.

When it is determined in step S213 that the period during which the acceleration of the end effector 302 exceeds the threshold has not disappeared (step S213: NO), the correcting unit 113 returns the process of the correcting unit 113 to step S210, and repeats the series of correction processes from step S210 to step S212. In addition, when it is determined in step S213 that no period during which the acceleration of the end effector 302 exceeds the threshold remains in the components for specifying the position (step S213: YES), the correcting unit 113 assumes that the correction of the specifying data as to the acceleration is completed, and advances the process to step S214.

The above example has described the case where the period during which the acceleration when the end effector 302 moves exceeds the tolerance is included in the specifying data. However, in the specifying data, also for a rotational acceleration of the end effector 302 when the posture of the end effector 302 changes, similarly, by correcting the components of the specifying data for specifying the posture of the end effector 302, the rotations of the end effector 302 that deviate from the tolerance can be prevented.

In this case, since the values indicative of the posture of the end effector 302 have been converted into the quaternion, the number of steps of the data processing can be reduced. Note that, the controller 200 that finally receives the specifying data may have a specification where the posture of the end effector 302 is specified by Euler angles to drive the robot 300. In this case, in the specifying data generating apparatus 110, the values of the quaternion indicative of the posture of the end effector 302 may be converted into Euler angles and used as the specifying data that is transmitted to the controller 200.

The specifying data generated by the generating unit 112 and corrected by the correcting unit 113, as described above, is transferred to the controller 200 of the robot 300 in the robot system 10 (step S214). The controller 200 sequentially specifies chronologically the positions of the end effector 302 of the robot 300 according to the received specifying data. Thereby, the controller 200 can drive the robot 300 with the specifying data, which specifies the motions of the end effector 302 configured to imitate the manual data received originally in the specifying data generating apparatus 110 and does not stop the robot 300 because of deviation of the motions from the tolerance.

For example, the stirring (emulsification, dispersion, pulverization, dissolution, mixing, stirring and kneading), which is one of unit operations in engineering, may cause contradictory actions such as dispersion and aggregation, depending on a magnitude of acceleration and the like acting on the operation target. In addition, when the robot 300 stops at the moment when it reaches a limit of an operation range, not only a desired action does not occur but also it may be necessary to discard the operation target for which the operation is suspended, due to, for example, excessive progress of a chemical reaction, and death, deterioration and the like of a living thing and a biological material. For this reason, the introduction of the robot 300 has been delayed in three-item industry where a target object that temporally changes is handled in many cases, and further, a continuous operation by skilled persons is included in a manufacturing process, in many cases.

However, as described above, by generating the specifying data for causing the robot to imitate the manual data while avoiding stop of the robot 300, it is possible to expand the range of use of the robot 300 in the three-item industry, such as heat equalization promotion in cooking, dispersion or emulsification of materials in productions of mayonnaise, dressings, cocktails, creams, emulsions and the like, a sewage treatment by a coagulant, movement of a viscous fluid, promotion of reaction, and the like. In addition, the present invention can also be preferably applied even when generating the specifying data of a robot configured to imitate a motion of a human, such as a pitching machine and a swing robot.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA) and programmable logic arrays (PLA).

Computer-readable media may include any tangible device that can store instructions for execution by a suitable device, such that the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (RTM) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark) and C++, and conventional procedural programming languages, such as the "C" programming language or similar programming languages.

Computer-readable instructions may be provided to programmable circuitry or a processor of a general purpose computer, special purpose computer, or other programmable data processing apparatus, locally or via a local area network (LAN), wide area network (WAN) such as the Internet, to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the scope described in the above embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, stages and the like of each process performed by an apparatus, system, program, and method shown in the claims, specification, and drawings can be performed in any order as long as the order is not indicated by "prior to," "before," or the like and as long as the output from a previous process is not used in a later process. Even if the process flow is described using phrases such as "first" or "next" in the claims, specification, and drawings, it does not necessarily mean that the process must be performed in this order.

EXPLANATION OF REFERENCES

10: robot system; 100: information processing apparatus; 101: body; 102: keyboard; 103: display; 104: pointing device; 110: specifying data generating apparatus; 111: acquiring unit; 112: generating unit; 113: correcting unit; 114: converting unit; 115: coarse-graining unit; 116: interpolating unit; 117: warning unit; 200: controller; 300: robot; 301: arm portion; 302: end effector

What is claimed is:

1. A specifying data generating apparatus comprising:
at least one processor;
a generating unit configured to generate, using the at least one processor, based on manual data indicative of a motion of a target object manually operated, specifying data for specifying, in association with a time, a position and a posture of an end effector of a robot configured to imitate the motion of the target object; and
a correcting unit configured, when a period during which a motion of the end effector operated according to the specifying data generated by the generating unit deviates from a predetermined tolerance has occurred, to correct, using the at least one processor, through extension in a time direction, the specifying data of at least the period during which there is the deviation from the tolerance.

2. The specifying data generating apparatus according to claim 1, wherein
the correcting unit is configured to correct, using the at least one processor, the specifying data, when at least one of a magnitude of a speed in, and a magnitude of an acceleration in the motion of the end effector according to the specifying data exceeds a threshold for defining a range not exceeding the tolerance.

3. The specifying data generating apparatus according to claim 2, wherein
the correcting unit is configured to correct, using the at least one processor, the specifying data with reference to the threshold determined on condition that an operation of the robot is suspended, when at least one of the magnitude of the speed in, and the magnitude of the acceleration in the motion of the end effector according to the specifying data exceeds the threshold.

4. The specifying data generating apparatus according to claim 1, wherein
the correcting unit is configured to generate, using the at least one processor, between a period in which the specifying data has been corrected and another period, additional data for smoothly continuing a change in speed and acceleration of the end effector between the period in which the correction has been made and the other period.

5. The specifying data generating apparatus according to claim 2, wherein
the correcting unit is configured to generate, using the at least one processor, between a period in which the specifying data has been corrected and another period, additional data for smoothly continuing a change in speed and acceleration of the end effector between the period in which the correction has been made and the other period.

6. The specifying data generating apparatus according to claim 3, wherein
the correcting unit is configured to generate, using the at least one processor, between a period in which the specifying data has been corrected and another period, additional data for smoothly continuing a change in speed and acceleration of the end effector between the period in which the correction has been made and the other period.

7. A specifying data generating apparatus comprising:
at least one processor;
a generating unit configured to generate, using the at least one processor, based on manual data indicative of a motion of a target object manually operated, specifying data for specifying, in association with a time, a position and a posture of an end effector of a robot configured to imitate the motion of the target object; and
a correcting unit configured, when a period during which at least one of the position and the posture of the end effector operated according to the specifying data generated by the generating unit deviates from a predetermined tolerance has occurred, to correct, using the at least one processor, through reduction, a change amount of the at least one of the position and the posture of the end effector of at least the period during which there is the deviation.

8. The specifying data generating apparatus according to claim 7, wherein
the correcting unit is configured, when the period during which the at least one of the position and the posture of the end effector moving according to the specifying data deviates from the tolerance has occurred, to correct, using the at least one processor, the specifying data by reducing the change amount of the at least one of the position and the posture of the end effector over an entire period of the specifying data.

9. The specifying data generating apparatus according to claim 7, wherein
the correcting unit is configured, when the period during which the at least one of the position and the posture of the end effector moving according to the specifying data deviates from the tolerance has occurred, to correct, using the at least one processor, the specifying data by further reducing the change amount of the at least one of the position and the posture of the end effector of the period, as compared to another period.

10. The specifying data generating apparatus according to claim 9, wherein
the correcting unit is configured to generate, using the at least one processor, between a period in which the specifying data has been corrected and another period, additional data for smoothly continuing a change in position of the end effector between the period in which the correction has been made and the other period.

11. The specifying data generating apparatus according to claim 10, wherein
the correcting unit is configured to generate, using the at least one processor, the additional data by any one of spline interpolation and hyperbolic tangent interpolation.

12. The specifying data generating apparatus according to claim 7, wherein
the correcting unit is configured to issue, using the at least one processor, a warning when a temporal length of the entire corrected specifying data is extended beyond a predetermined threshold.

13. The specifying data generating apparatus according to claim 1, wherein
the generating unit is configured to coarse-grain the specifying data using the at least one processor.

14. The specifying data generating apparatus according to claim 13, wherein
the generating unit further includes an interpolating unit configured to interpolate, using the at least one processor, the specifying data in conformity to a temporal resolution as to the motions of the robot.

15. The specifying data generating apparatus according to claim 14, wherein
the interpolating unit is configured to interpolate, using the at least one processor, by spherical quadrilateral interpolation, the specifying data for specifying the posture of the end effector.

16. The specifying data generating apparatus according to claim 14, wherein
the interpolating unit is configured to interpolate, using the at least one processor, by spline interpolation, the specifying data for specifying the position of the end effector.

17. A specifying data generating method performed by at least one processor, the method comprising:
using the at least one processor to generate, based on manual data indicative of a motion of a target object manually operated, specifying data for specifying, in association with a time, a position and a posture of an end effector of a robot configured to imitate the motion of the target object; and
when a period during which a motion of the end effector based on at least one of the position and the posture of the end effector operated according to the specifying data generated in the generation deviates from a predetermined tolerance has occurred, using the at least one processor to correct, through extension in a time direction, the specifying data of at least the period during which there is the deviation from the tolerance.

18. A specifying data generating method performed by at least one processor, the method comprising:
using the at least one processor to generate, based on manual data indicative of a motion of a target object manually operated, specifying data for specifying, in association with a time, a position and a posture of an end effector of a robot configured to imitate the motion of the target object; and when a period during which at least one of the position and the posture of the end effector operated according to the specifying data generated in the generation deviates from a predetermined tolerance has occurred, using the at least one processor to correct, through reduction, a change amount of the at least one of the position and the posture of the end effector of at least the period during which there is the deviation.

19. A non-transitory computer-readable storage medium having a specifying data generating program stored thereon that, when executed on at least one processor, causes the at least one processor to perform operations including:
generating, based on manual data indicative of a motion of a target object manually operated, specifying data for specifying, in association with a time, a position and a posture of an end effector of a robot configured to imitate the motion of the target object; and
when a period during which a motion of the end effector based on at least one of the position and the posture of the end effector operated according to the specifying data generated in the generation deviates from a predetermined tolerance has occurred, correcting, through extension in a time direction, the specifying data of at least the period during which there is the deviation.

20. A non-transitory computer-readable storage medium having a specifying data generating program stored thereon that, when executed on at least one processor, causes the at least one processor to perform operations including:
generating, based on manual data indicative of a motion of a target object manually operated, specifying data for specifying, in association with a time, a position and a posture of an end effector of a robot configured to imitate the motion of the target object; and
when a period during which at least one of the position and the posture of the end effector operated according to the specifying data generated in the generation deviates from a predetermined tolerance has occurred, correcting, through reduction, a change amount of the at least one of the position and the posture of the end effector of at least the period during which there is the deviation.

* * * * *